(12) United States Patent
Takata

(10) Patent No.: US 10,025,022 B2
(45) Date of Patent: Jul. 17, 2018

(54) MULTICOLOR DISPLAY DEVICE

(71) Applicant: Panasonic Intellectual Property Management Co., Ltd., Osaka (JP)

(72) Inventor: Kazumasa Takata, Osaka (JP)

(73) Assignee: Panasoinc Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/227,592

(22) Filed: Aug. 3, 2016

(65) Prior Publication Data

US 2017/0115441 A1  Apr. 27, 2017

(30) Foreign Application Priority Data

Oct. 22, 2015  (JP) ................. 2015-207598
May 31, 2016  (JP) ................. 2016-108032

(51) Int. Cl.
*F21V 7/04*     (2006.01)
*F21V 8/00*     (2006.01)

(52) U.S. Cl.
CPC ............. *G02B 6/006* (2013.01); *G02B 6/002* (2013.01); *G02B 6/0036* (2013.01); *G02B 6/0068* (2013.01)

(58) Field of Classification Search
CPC ...................................................... G02B 6/006
See application file for complete search history.

(56) References Cited

U.S. PATENT DOCUMENTS

| | | | |
|---|---|---|---|
| 6,712,481 B2 | 3/2004 | Parker et al. | |
| 2001/0049893 A1* | 12/2001 | Maas | G02B 6/0036 40/544 |
| 2002/0141174 A1 | 10/2002 | Parker et al. | |
| 2009/0073721 A1* | 3/2009 | Kamikatano | F21V 7/05 362/616 |
| 2013/0265802 A1 | 10/2013 | Kamikatano et al. | |
| 2014/0043850 A1 | 2/2014 | Thompson et al. | |
| 2015/0346426 A1* | 12/2015 | Chen | G02B 6/002 362/606 |

FOREIGN PATENT DOCUMENTS

| | | |
|---|---|---|
| JP | 4-246683 | 9/1992 |
| WO | 2000/050807 | 8/2000 |
| WO | 2013/024812 | 2/2013 |
| WO | 2013/035788 | 3/2013 |

* cited by examiner

*Primary Examiner* — Sean Gramling
(74) *Attorney, Agent, or Firm* — Panasoinc IP Management; Kerry S. Culpepper

(57) ABSTRACT

A multicolor display device realizes multicolor display with high color reproducibility which can be felt beautiful. A red light, a green light and a blue light are incident on a light guide body on which a picture pattern is formed from light sources as first light sources, and a white light is incident thereon from a light source as a second light source to display the picture pattern in multi-colors, thereby realizing beautiful display with good reproducibility of a white color.

6 Claims, 15 Drawing Sheets

MULTICOLOR DISPLAY DEVICE

TECHNICAL FIELD

The technical field relates to a multicolor display device displaying a color picture by allowing plural lights to be incident into a light guide body.

BACKGROUND

There exists a multicolor display device described in JP-A-4-246683 (Patent Document 2).

In the above device, lamps 11A to 11F having different colors are disposed on side surfaces of respective ridge lines of a light guide plate 10 as shown in FIG. 21, and these lamps 11A to 11F are driven to be turned on appropriately by a power source 14 through 15 lighting circuits 12A to 12F and a control circuit 13, thereby allowing color lights to be incident into the light guide plate 10 and displaying a display body 15 disposed on the light guide plate 10 in multi-colors.

As the relation between the side surfaces of respective ridge lines of the light guide plate 10 and light emitting colors of the lamps 11A to 11F, lamps of the same color systems are arranged on opposite sides of respective ridge lines of the light guide plate 10. For example, red is used as the light emitting color of the lamps 11A and 11D, blue is used as the light emitting color of the lamps 11B and 11E and green is used as the light emitting color of the lamp 11C and 11F.

According to the above structure, multicolor lights are allowed to be incident into the light guide plate 10 and to be mixed, thereby realizing multicolor display.

SUMMARY

In the above related-art technique, the multicolor display is realized by allowing lights from plural lamps 11A to 11F having different colors to be incident into the light guide plate 10. When multi-colors are expressed, the beauty of colors, in other words, high color reproducibility is necessary.

In the case where the display body 15 is expressed with white, it can be expressed by mixing red, green and blue which are three primary colors of light. Sky blue can be expressed by mixing green and blue.

Particularly in the case where white is expressed, white tends to be recognized as a different color when intensities of respective colors to be entered differ. In the case where a light intensity of red is higher than other colors which are green and blue, the display body 15 is displayed with pink, not with white. When sky blue is expressed, the difference of colors is not conspicuous as compared with the case of white even when intensities of green and blue differ.

An object of the present disclosure is to provide a multicolor display device capable of realizing-multicolor display with high color reproducibility which can be felt beautiful by solving the related-art problem that white is seen as another color, not being seen as beautiful white.

According to an embodiment of the present disclosure, there is provided a multicolor display device including a light guide body on which a picture pattern is formed by an aggregation of fine shapes, and plural light sources for allowing lights to be incident on the inside the light guide body, in which the lights incident on and introduced into the light guide body are reflected by the fine shapes and emitted from a light emitting surface of the light guide body to display the picture pattern, and the plural light sources include first light sources emitting lights and a second light source emitting a light of white which is different from colors of the first light sources.

As the multicolor display device according to the present disclosure is provided with not only the first light sources but also the second light source emitting the white light to perform color display of the picture pattern, therefore, white in a color scheme of the picture pattern can be displayed as beautiful white, which realizes multicolor display, namely, color display with high color reproducibility which can be felt beautiful.

DESCRIPTION OF EMBODIMENTS

Hereinafter, respective embodiments of the present disclosure will be explained with reference to the drawings.

Embodiment 1

Figure 1:
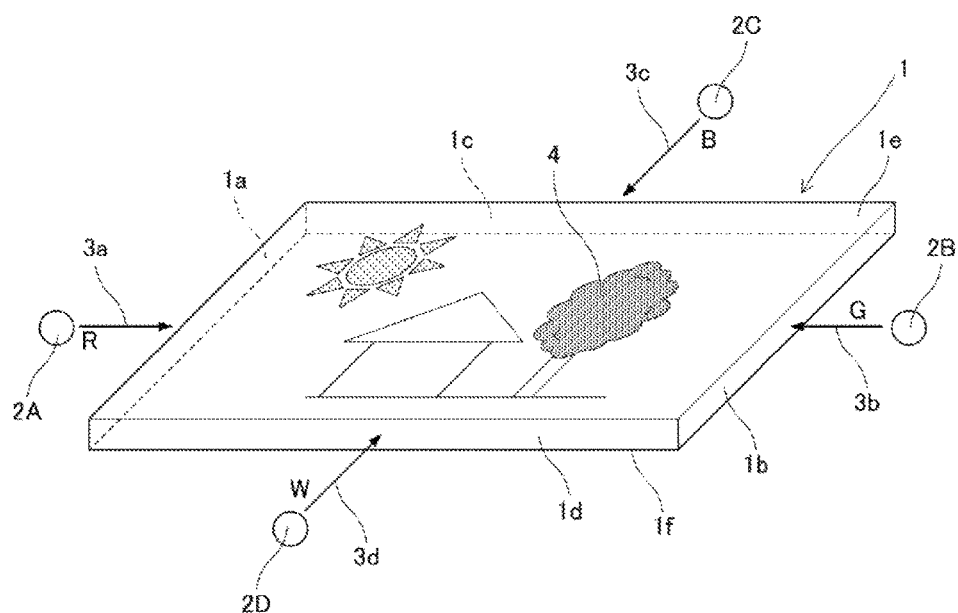
FIG. 1 is a perspective view of a multicolor display device according to Embodiment 1 of the present disclosure.

FIG. 1 shows a multicolor display device according to Embodiment 1 of the present disclosure.

The multicolor display device includes a light guide plate 1 as a light guide body and light sources 2A, 2B, 2C and 2D emitting lights having different light emitting colors.

The light guide plate 1 is formed by a side surface 1a on which light from the light source 2A is incident, a side surface 1b on which light the light source 2B is incident, s side surface 1c on which light from the light source 2C is incident, a side surface 1d on which light from the light source 2D is incident, a light emitting surface 1e from which light is emitted and a rear wall surface 1f facing the light emitting surface 1e.

In the light sources 2A, 2B and 2C as first light sources, a light 3a emitted from the light source 2A is red, a light 3b emitted from the light source 2B is green and a light 3c emitted from the light source 2C is blue. The light source 2D as a second light source emits a light 3d having a white color which is different from colors of lights emitted from the light sources 2A, 2B and 2C.

Figure 2:
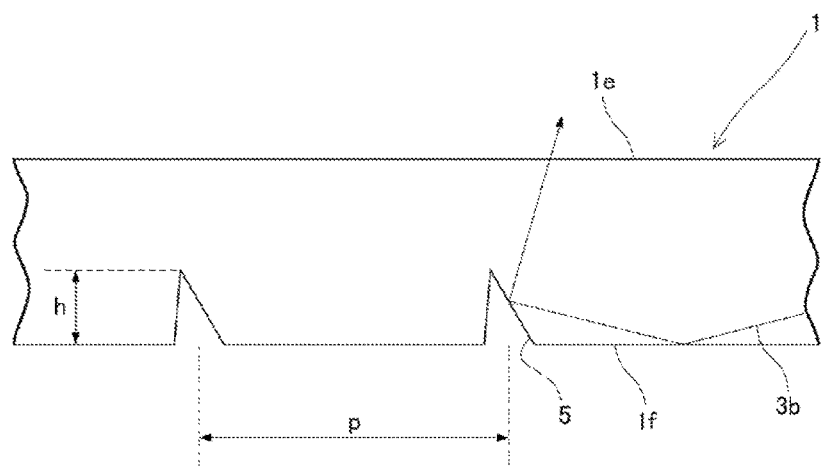
FIG. 2 is an enlarged cross-sectional view of a light guide plate according to the embodiment.

FIG. 2 is an enlarged cross-sectional view of the light guide plate 1. An aggregation of fine shapes 5 is formed on the rear wall surface 1f of the light guide plate 1 in accordance with a picture pattern 4. The fine shapes 5 are formed so that lights incident into the light guide plate 1 are reflected to the light emitting surface 1e in accordance with the target picture pattern 4 to be displayed. A cross-sectional shape of the fine shapes 5 which is perpendicular to the light emitting surface 1e is an asymmetric approximately triangular shape, and the fine shapes 5 reflect lights from particular directions toward the light emitting surface 1e. The picture pattern 4 in this case is a landscape including a picture of a house, a picture of a tree and a picture of the sun floating in the sky.

As four light sources having different light emitting colors are used in the embodiment, the fine shapes 5 are arranged so as to correspond to the light emitting colors of respective light sources in accordance with a color scheme of the picture pattern 4. Intensities of lights from respective light sources reflected by respective fine shapes 5 and emitted from the light emitting surface 1e of the light guide plate 1 will be display gradations of respective light emitting colors.

Figure 3:
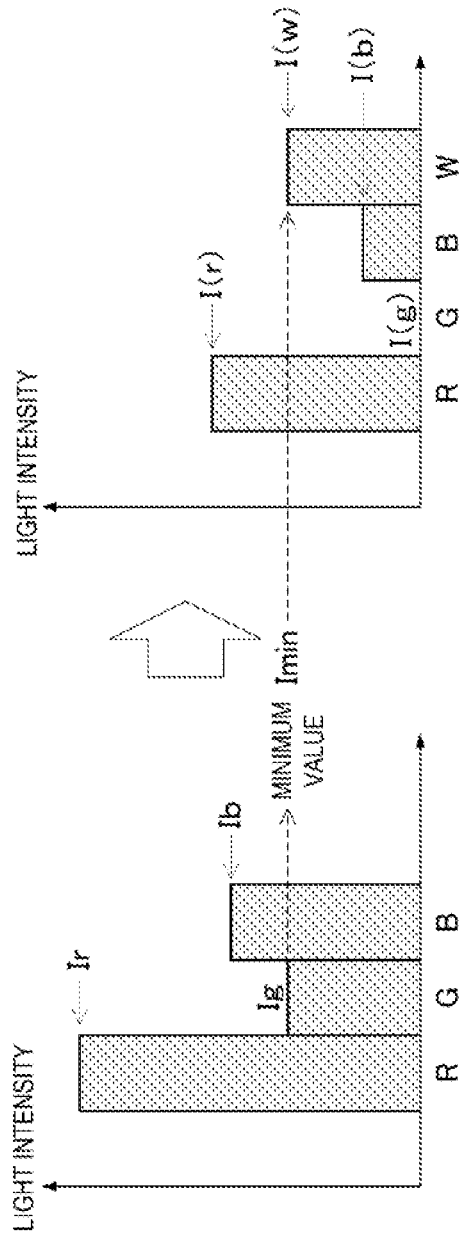
FIG. 3 show graphs for explaining a method of converting RGB gradation values into RGBW gradation values according to the embodiment.

FIG. 3 shows specific examples in which colors at a certain point 5 in the target picture pattern 4 to be color-displayed are converted from gradation values of red, green and blue as three primary colors of light into gradation values necessary for displaying the colors by using light sources having different light emitting colors of red, green, blue and white.

In this case, respective gradations of red, green, and blue before conversion are respectively represented by Ir, Ig and Ib. The smallest gradation value in Ir, Ig and Ib is represented by Imin, Ig is equal to Imin.

When these gradations are converted into respective gradations of red, green, blue and white, a gradation of white I(w) is set as Imin. A gradation of red I(r) is set to Ir–Iw as a value obtained by subtracting Iw from the original gradation of red Ir. A gradation of green I(g) is set to Ig–Iw as a value obtained by subtracting Iw from the original gradation of green Ig. In this case, a gradation 20 value of green I(g) after conversion is zero. A gradation of blue I(b) is set to Ib–Iw as a value obtained by subtracting Iw from the original gradation of blue Ib.

As described above, values obtained by subtracting the gradation of white from the original gradations of red, green and blue are converted as new gradation values of red, green and blue. The picture pattern divided into respective components of red, green, blue and white is formed by the aggregation of fine shapes 5.

A method of forming the picture pattern will be explained in detail with reference to FIG. 4 to FIG. 9.

Figure 4:
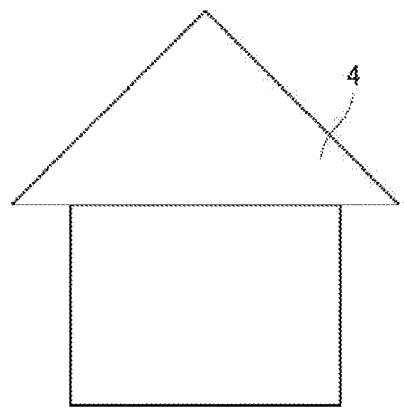
FIG. 4 is a view showing an example of a shape of a picture pattern according to the embodiment.

FIG. 4 shows part of the picture pattern 4 shown in FIG. 1.

Figure 5A:
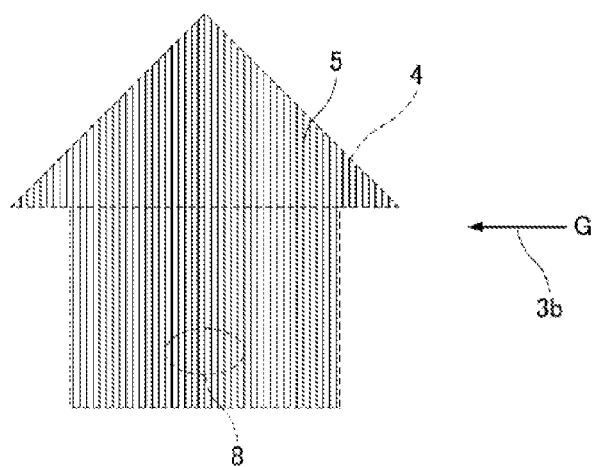
FIG. 5A is a plan view showing an incident direction of a light necessary for a color scheme of green in a picture pattern and FIG. 5B is an enlarged cross-sectional view showing fine shapes formed in the light guide plate according to the embodiment.
Figure 5B:
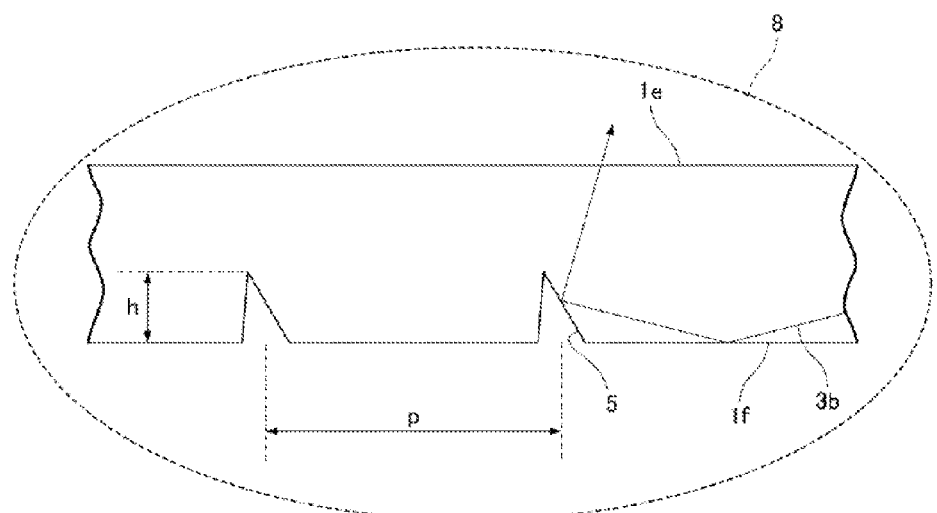

FIG. 5A shows a method of forming a picture pattern corresponding to a light of green (G) when the light is incident from the observer's right side of the light guide plate 1. FIG. 5B is a cross-sectional view of a part 8 in FIG. 5A, which shows the aggregation of the fine shapes 5 reflecting the light in an enlarged state. The fine shape 5 which reflects the light 3b of green in the above manner is a linear prism with a triangular cross section which has a ridge line in a direction approximately perpendicular to an incident direction of the light 3b to be incident. The light 3b of green reflected off the fine shape 5 in FIG. 5B is emitted from the light emitting surface 1e. The gradation value is controlled by a height "h" of the fine shapes 5 or a pitch "p" of the fine shapes 5.

Figure 6A:
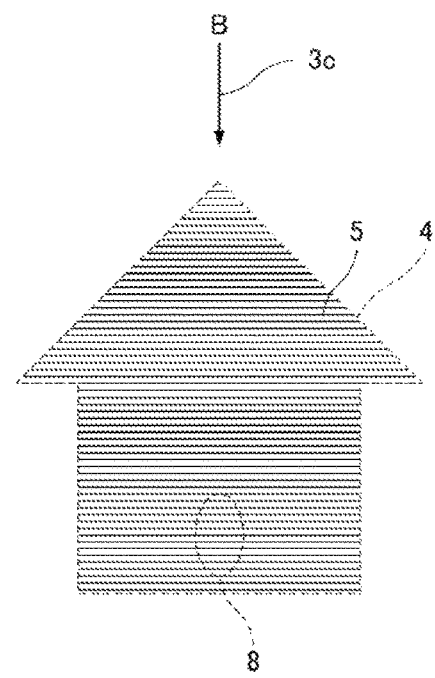
FIG. 6A is a plan view showing an incident direction of a light necessary for a color scheme of blue in the picture pattern.
Figure 6B:
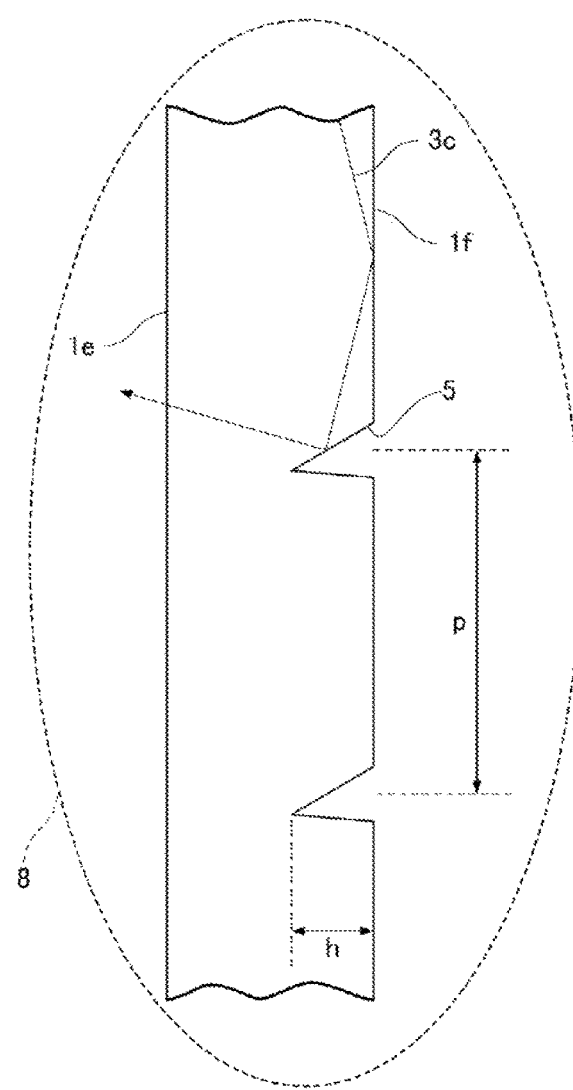
FIG. 6B is an enlarged cross-sectional view showing fine shapes formed in the light guide plate according to the embodiment.

FIG. 6A shows a method of forming a picture pattern corresponding to a light of blue (B) when the light is incident from the observer's upper side of the light guide plate 1. FIG. 6B is a cross-sectional view of a part 8 in FIG. 6A, which shows the aggregation of the fine shapes 5 reflecting the light in an enlarged state. The fine shape 5 which reflects the light 3c of blue in the above manner is a linear prism, with a triangular cross section which has a ridge line in a direction approximately perpendicular to an incident direction of the light 3c to be incident. The light 3c of blue reflected off the fine shape 5 in FIG. 6B is emitted from the 20 light emitting surface 1e. The gradation value is controlled by the height "h" of the fine shapes 5 or the pitch "p" of the fine shapes 5.

Figure 7A:
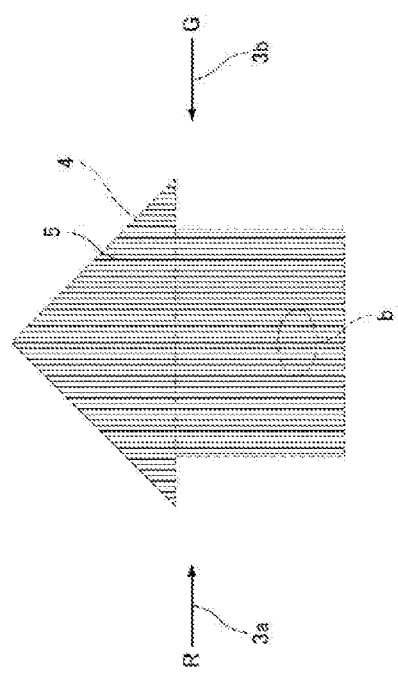
FIG. 7A is a plan view showing incident directions of lights necessary for a color scheme of red and green in the picture pattern and FIG. 7B is an enlarged cross-sectional view showing fine shapes formed in the light guide plate according to the embodiment.
Figure 7B:
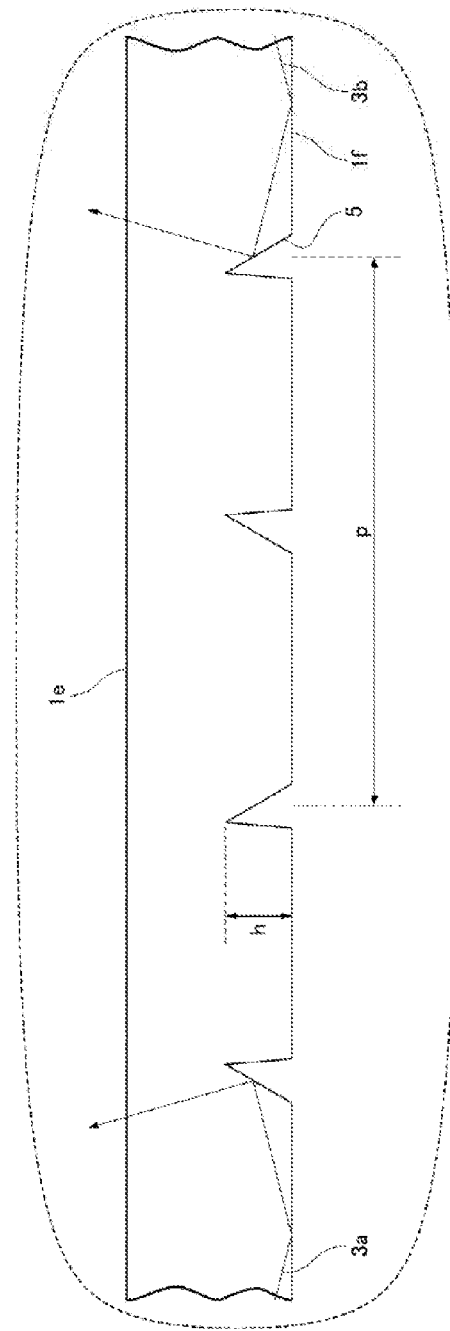

FIG. 7A shows a method of forming a picture pattern corresponding to a light of green (G) and a light of red (R) when 25 the light of green (G) is incident from the observer's right side of the light guide plate 1 and the light of red (R) is incident from the observer's left side of the light guide plate 1. FIG. 7B is a cross-sectional view of a part S in FIG. 7A, which shows the aggregation of the fine shapes 5 reflecting the lights in an enlarged state.

The shape of the fine shape 5 which reflects the light 3b of green is a linear prism with a triangular cross section which has a ridge line in a direction approximately perpendicular to an incident direction of the light 3b to be incident.

The light 3b of green reflected off the fine shape 5 in FIG. 7B is emitted from the light emitting surface 1e. The shape of the fine shape 5 which reflects the light 3a of red is a linear prism with a triangular cross section which has a ridge line in a direction approximately perpendicular 5 to an incident direction of the light 3a to be incident. The light 3a of red reflected off the fine shape 5 in FIG. 73 is emitted from the light emitting surface 1e. The gradation values are controlled by the height "h" of the fine shapes 5 or the pitch "p" of the fine shapes 5.

As described above, the fine shapes 5 reflecting the light 3b of green and the fine shapes 5 reflecting the light 3a of red are arranged in a mixed state.

Figure 8A:
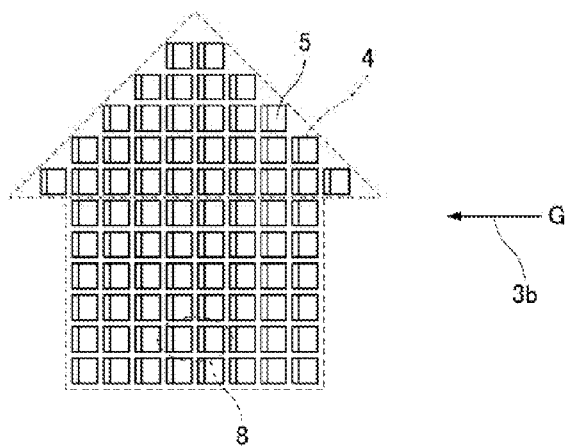
FIG. 8A is a plan view showing an incident direction of a light necessary for a color scheme of green in a picture pattern and FIG. 8B is an enlarged cross-sectional view showing fine shapes formed in the light guide plate according to the embodiment.
Figure 8B:
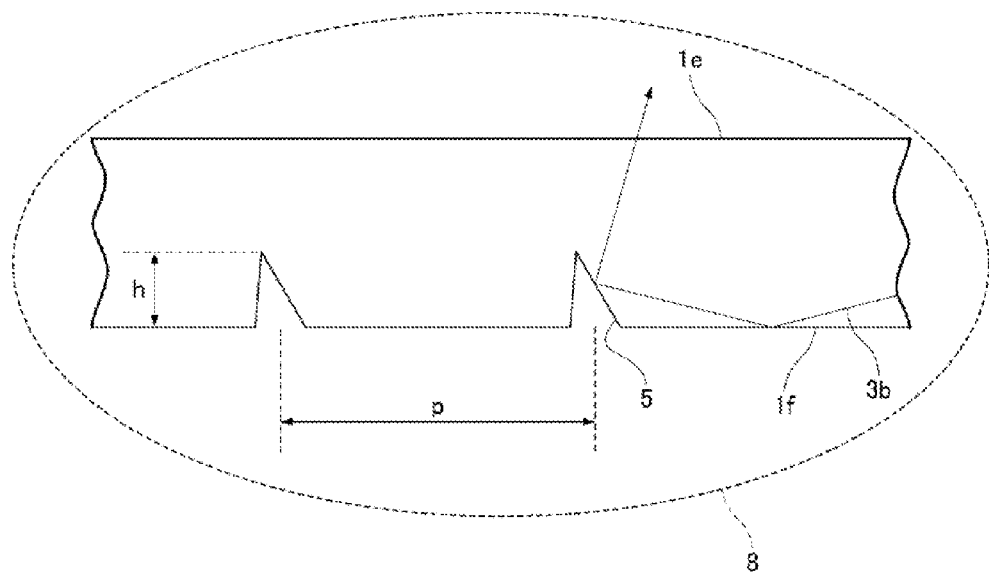

FIG. 6A shows another method of forming a picture pattern corresponding to a light of green (G) when the light is incident from the observer's right side of the light guide plate 1. Although the linear prism with the triangular cross section having a short length in a longitudinal direction is used as the fine shape reflecting the light in FIG. 5 to FIG. 7, a case where the picture pattern 4 is formed by the fine shapes 5 having a short prism shape with a triangular cross section is shown in FIG. 8A. FIG. 8B is a cross-sectional view of a part 8 in FIG. 8A, and the light 3b of green is reflected off the fine shape 5 and emitted from the light emitting surface 1e. The gradation value is controlled by the height of the fine shapes 5 or the pitch of the fine shapes 5.

Figure 9:
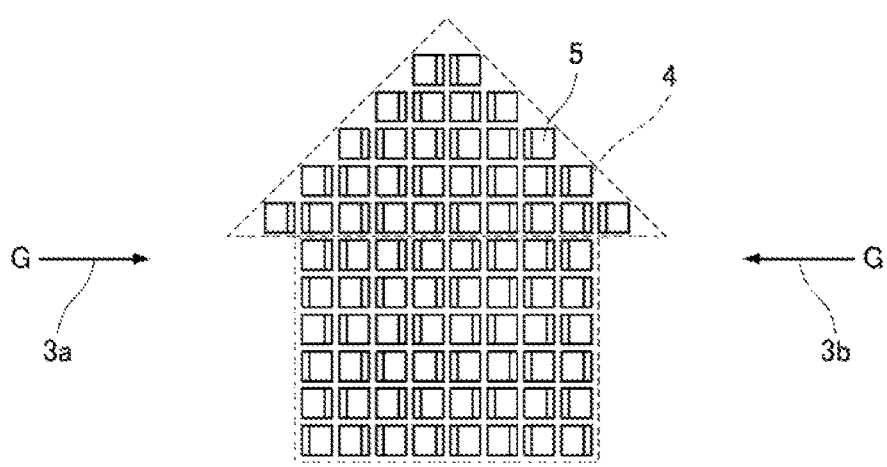
FIG. 9 is a plan view showing light incident directions of lights necessary for a color scheme of red and a color scheme of green in the picture pattern according to the embodiment.

FIG. 9 shows an example of prisms used in a case of forming a picture pattern obtained by using different lights incident from opposite two directions when forming the picture pattern by the short prisms with the triangular cross section. Reflection surfaces of the respective fine shapes for reflecting incident lights are arranged in a mixed state so that reflection surfaces reflect respective incident lights 3a and 3b.

Figure 10:
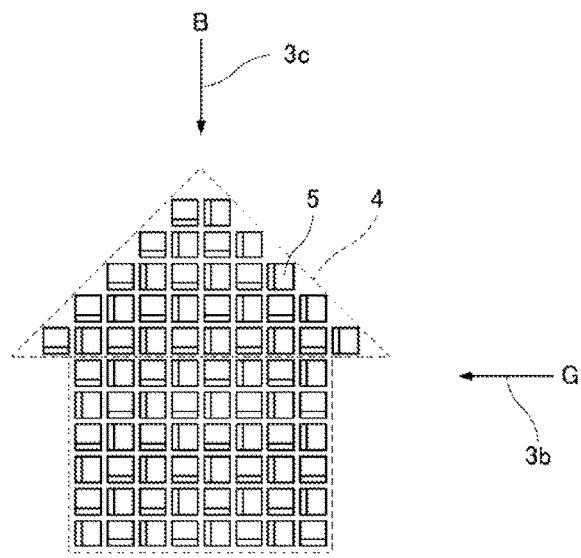
FIG. 10 is a plan view showing light incident directions of lights necessary for a color scheme of green and a color scheme of blue in the picture pattern according to the embodiment.

FIG. 10 shows an example of prisms used in a case of forming a picture pattern obtained by using different lights incident from orthogonal two directions when forming the picture pattern by the short prisms with the triangular cross section.

Reflection surfaces of the respective fine shapes 5 for reflecting incident lights are arranged in a mixed state so that reflection surfaces reflect the light 3b of green and the light 3c of blue.

In the methods of forming the picture pattern explained in FIG. 5 to FIG. 10, the methods of forming the picture pattern by allowing the lights to be incident from one direction or two directions are described. The picture pattern 4 can be formed by allowing lights of different colors to be incident from three directions or four directions by combining the above methods.

The gradation values are controlled by the height "h" of the fine shapes 5 or the pitch "p" of the fine shapes 5. For example, in a point where the gradation value is high, the height W is set to be large or the pitch "p" is set to be small. Respective colors of red, green, blue and white are allowed to be incident from respective edges of side surfaces of the light guide plate 1 so as to correspond to the reflection surfaces of the fine shapes 5, thereby expressing a beautiful color image, namely, a multicolor image with high color reproducibility.

The fine shapes 5 having the triangular cross section which reflects lights are described in the above description, however, the same advantages can be obtained also when using fine shapes having a trapezoidal cross section.

It is also possible to suppress unevenness in light intensity within a surface by increasing the height "h" of the fine shapes 5 as reflection bodies or reducing the pitch "p" of the fine shapes in places farther from the light sources of the picture pattern, which can consequently reduce color unevenness.

The fine shape reflecting the white color is the same as one obtained by vertically inverting the fine shape in FIG. 6B. The gradation value is controlled by the height "h" of the fine shapes 5 or the pitch "p" of the fine shapes 5.

The light source of white is used in addition to the light sources of red, green and blue, thereby displaying beautiful white which is not seen as another color.

Furthermore, blue is incident from the observer's upper side of the light guide plate 1, green is incident from the right direction, red is incident from the left direction and white is incident from the lower direction in the explanation of FIG. 1, however, light incident directions of respective colors are not fixed.

That is, the light incident directions are preferably determined in accordance with the color scheme of the picture pattern 4 as described below.

As the relation between respective side surfaces of the light guide plate 1 and colors of lights incident thereon, it is preferable that a color of a certain component is incident on a portion containing a large quantity of the component in components of red, blue, green and white in the color scheme of color display in the picture pattern 4 from a side surface close to the portion. Specifically, in the case where a large quantity of blue of the sky is contained on an upper side of the light guide plate 1, a large quantity of green of the tree is contained on a right side and a large quantity of red of the sun is contained in a left side as in the landscape picture pattern shown in FIG. 1, blue is allowed to be incident from the side surface on the upper side, green is allowed to be incident from the side surface on the right side and red is allowed to be incident from the side surface on the left side of the light guide plate 1 so as to correspond to the picture pattern, thereby obtaining beautiful color display.

As described in FIG. 3, the minimum luminance of red, green and blue before conversion is set as the luminance of white after conversion, and the luminance of white after conversion is subtracted from the original luminances of red, green and blue, thereby being converted into new respective components of red, green, blue and white. In other words, the minimum, luminance value of luminance values of respective colors before conversion is replaced with the luminance of one color of white. That is, the total of luminance values of respective colors after conversion becomes smaller than that of respective colors before conversion by the replacement with the white color. This indicates that the prism height or the prism density for emitting respective colors becomes small. Accordingly, the prism height or the prism density becomes small and the transparency is improved. The existence of the light guide plate 1 is inconspicuous when lights of respective colors do not enter the light guide plate 1, and the existence thereof becomes conspicuous when lights of respective colors enter the light guide plate 1, therefore, there is a merit that a sense of surprise can be given as a display device.

Embodiment 2

Figure 11:
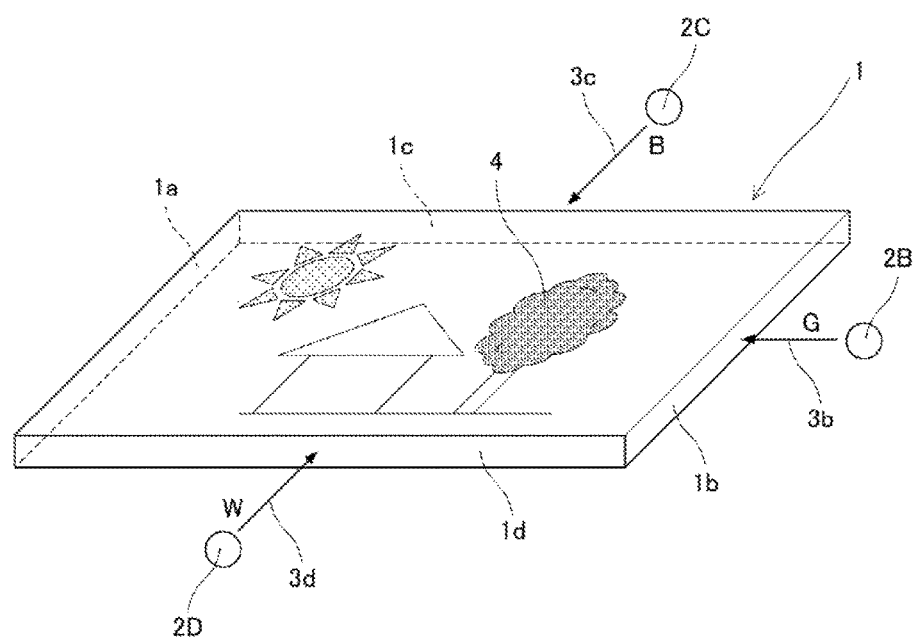
FIG. 11 is a perspective view of a multicolor display device according to Embodiment 2 of the present disclosure.
Figure 12:
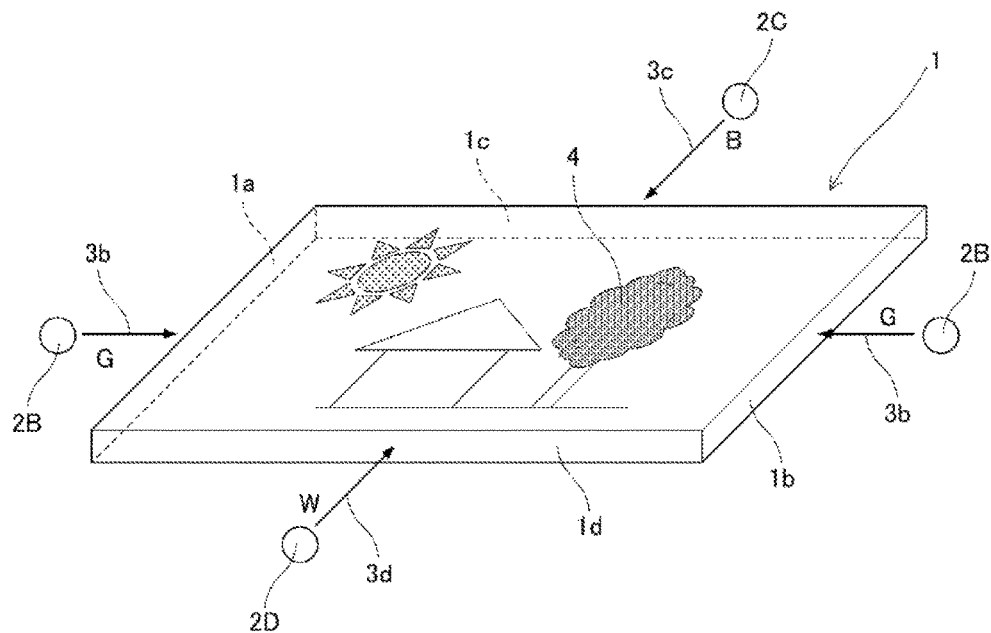
FIG. 12 is a perspective view showing another example of incident directions of lights according to the embodiment.

FIG. 11 and FIG. 12 respectively show a multicolor display device according to Embodiment 2 of the present disclosure. The same symbols are given to the same components as those of FIG. 1, and explanation thereof is omitted.

Although lights of four colors of red, green, blue and white are allowed to enter from all the four side surfaces of the light guide plate 1 in Embodiment 1 shown in FIG. 1, it is not always necessary to use all the four colors, depending on the picture pattern 4. Accordingly, a case where red is not used is described in FIG. 11 as an example of the picture pattern which can be displayed in good condition with three colors.

Figure 13:
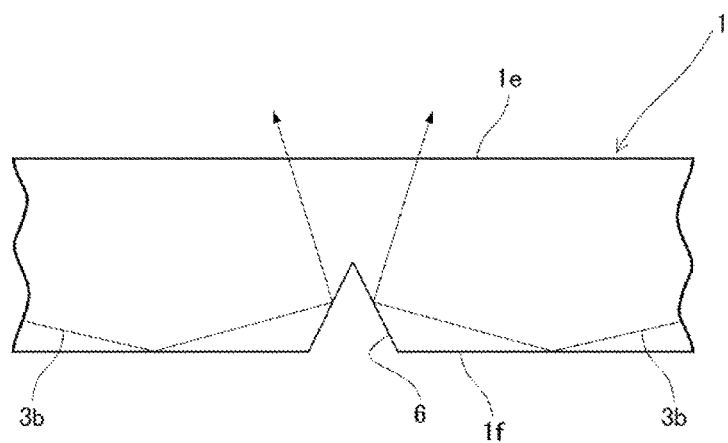
FIG. 13 is an enlarged cross-sectional view of a light guide plate showing another example of a fine shape according to the embodiment.

When three colors or less are enough to be used for expressing the picture pattern 4, the same color, for example, the light 3b of green is allowed to enter from edges of the facing side surfaces as shown in FIG. 12, thereby realizing further uniform coloring. In this case, lights incident from two edges of facing side surfaces can be deflected toward the light emitting surface 1e of the light guide plate 1 efficiently by forming a fine shape 6 for reflecting lights to have an approximately isosceles triangular cross section as shown in FIG. 13.

The unevenness in light intensity may occur within the surface due to light attenuation at places far from light incident portions, however, the unevenness in light intensity can be suppressed by allowing the lights to enter from both facing sides, as a result, color unevenness can be suppressed. Furthermore, the light source of white is used in addition to the light sources of red, green and blue, thereby displaying beautiful white which is not seen as another color.

Embodiment 3

Figure 14:
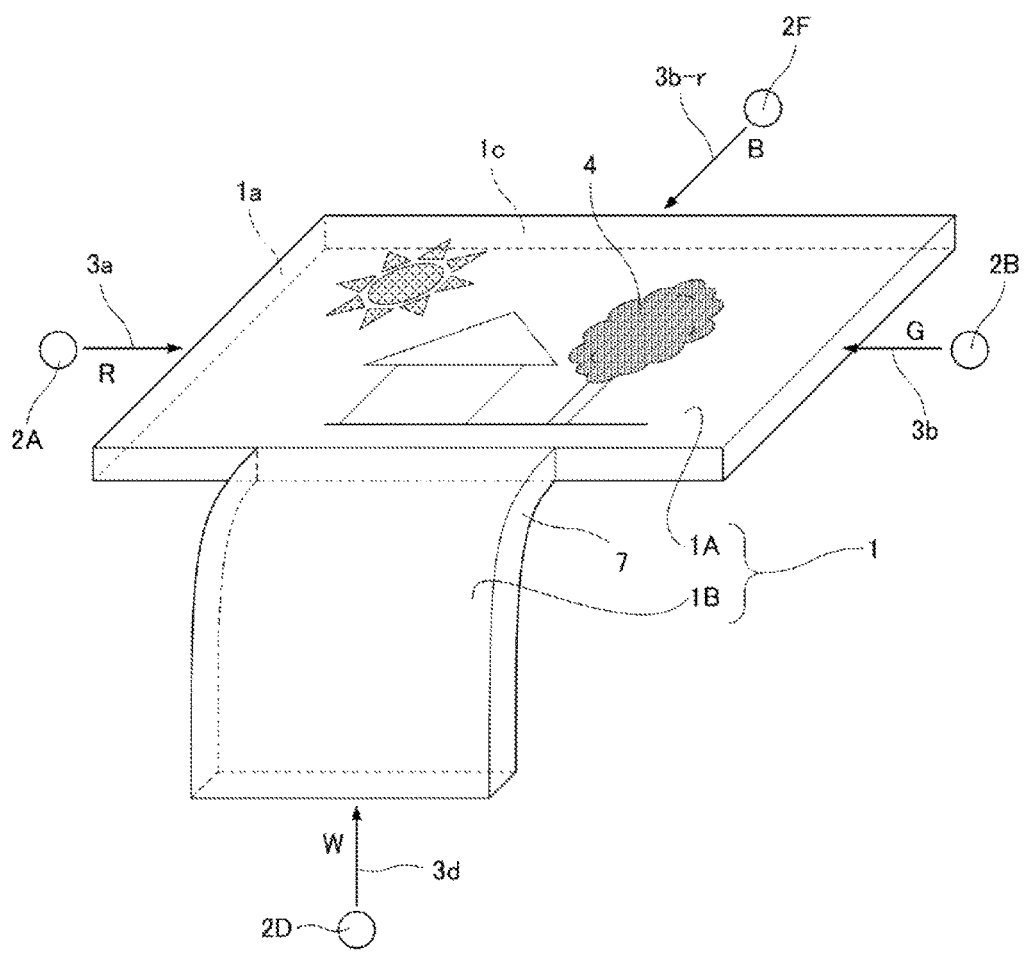
FIG. 14 is a perspective view of a multicolor display device according to Embodiment 3 of the present disclosure.

FIG. 14 shows a multicolor display device according to Embodiment 3 of the present disclosure. The same symbols are given to the same components as those of FIG. 1, and explanation thereof is omitted.

The case where the shape of the light guide plate 1 is a flat-plate shape has been explained in Embodiments 1 and 2. The shape of the light guide plate 1 may be three-dimensional shapes having a curved surface.

The light guide plate 1 shown in FIG. 14 includes a light guide plate body 1A on which the picture pattern 4 is formed and a light introducing path 1B one end of which is connected to a side surface of the light guide plate body 1A. The other end of the light introducing path 1B extends in a direction toward the back surface side of the light guide plate body 1A through a curved surface portion 7. A material of the light introducing path 1B is the same as that of the light guide plate 1A, and the light guide plate body 1A and the light introducing path 1B are integrally formed.

The light guide plate 1 shown in FIG. 14 has a three-dimensional shape in which the light introducing path 1B connected to the side 25 surface on the near side has a curved surface and bends downward, and a light, for example, the light 3d of white enters from an end surface of the other end of the light introducing path 1B.

Only one edge of the light guide plate 1 has the curved surface and bends in FIG. 14, however, two edges or three edges of the light 30 guide plate 1, or all the four edges of the light guide plate 1 may have curved surfaces and may bend. The light of white enters from the bent portion, however, light of red, green or blue may enter.

Embodiment 4

Figure 15:
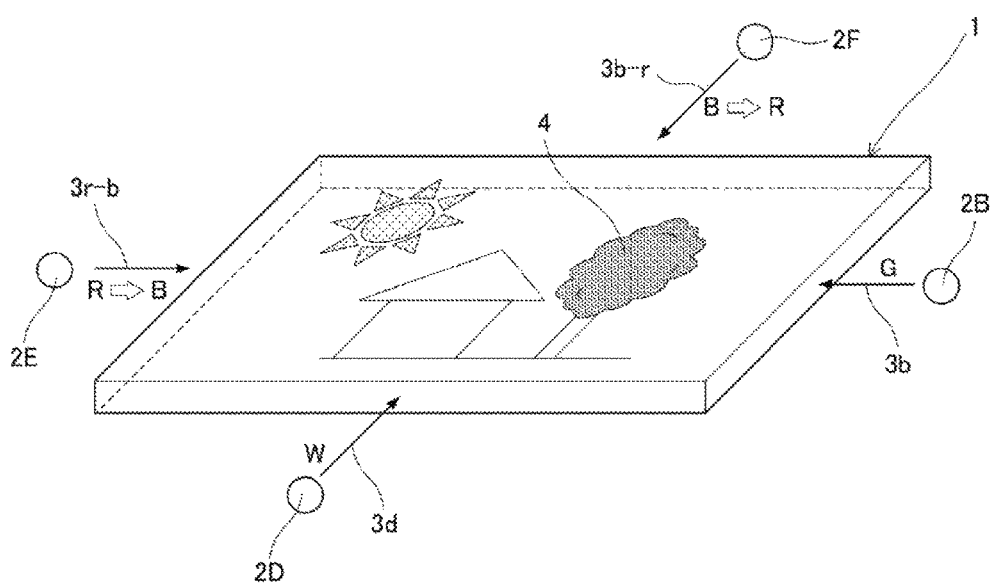
FIG. 15 is a perspective view of a multicolor display device according to Embodiment 4 of the present disclosure.

FIG. 15 shows a multicolor display device according to Embodiment 4 of the present disclosure. The same symbols are given to the same components as those of FIG. 1, and explanation thereof is omitted.

In the above respective embodiments, colors of lights emitted from the light, sources 2A, 2B, 2C and 2D are fixed and the colors of lights are not variable. Embodiment 4 differs from the above embodiments in a point that light sources 2E and 2F in which colors of lights are variable are used instead of the light sources 2A and 1B.

In FIG. 15, a light emitting diode which emits lights of three colors is used as the light source 2E which emits lights to the left side surface of the light guide plate 1, changing the color of a light 3r-b from red to blue. Furthermore, the light emitting diode which emits lights of three colors is used as the light source 2F which emits lights to the upper side surface of the light guide plate 1, changing the color of a light 3b-r from blue to red.

According to the above, the tone of the picture pattern can be changed. For example, in the case of the picture pattern 4 of the landscape variation can be given to a portion of the sky in the picture pattern 4 such as a change from the blue sky in the daytime to the red sunset sky in the evening.

Although blue turns to red, and red turns to blue in FIG. 15, the variation of the tone can be given by setting which color is changed and in which manner tire color is changed depending on the content of the picture pattern.

Embodiment 5

Figure 16:
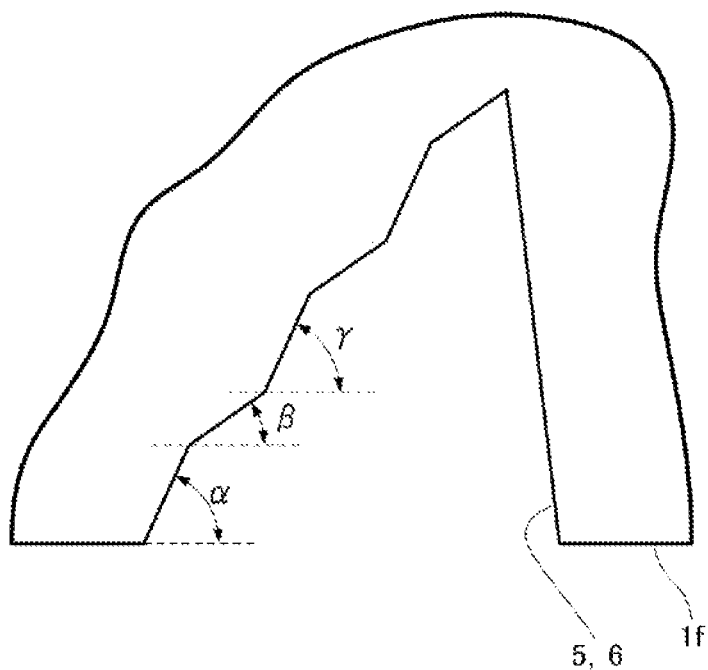
FIG. 16 is an enlarged cross-sectional view of a light guide plate showing a fine shape in a multicolor display device according to Embodiment 5 of the present disclosure.
Figure 17:
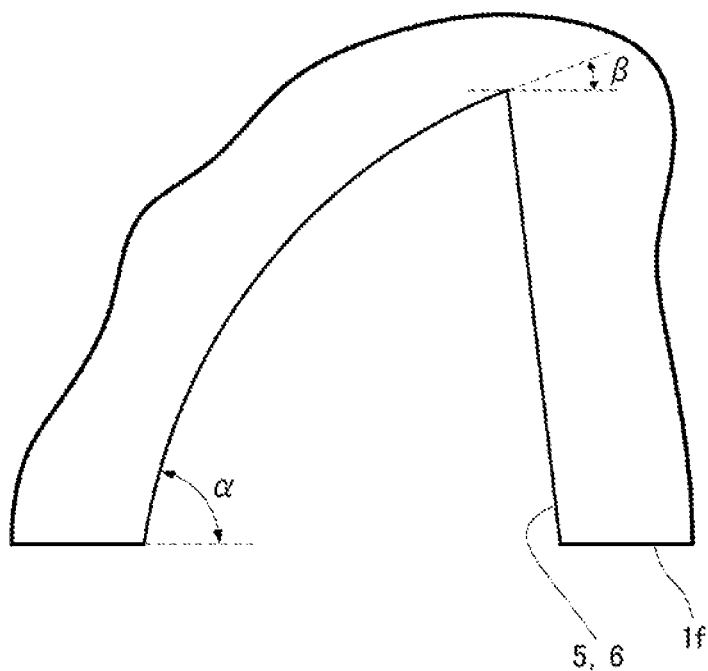
FIG. 17 is an enlarged cross-sectional view of the light guide plate showing another example of the fine shape in the multicolor display device according to the embodiment.
Figure 18:
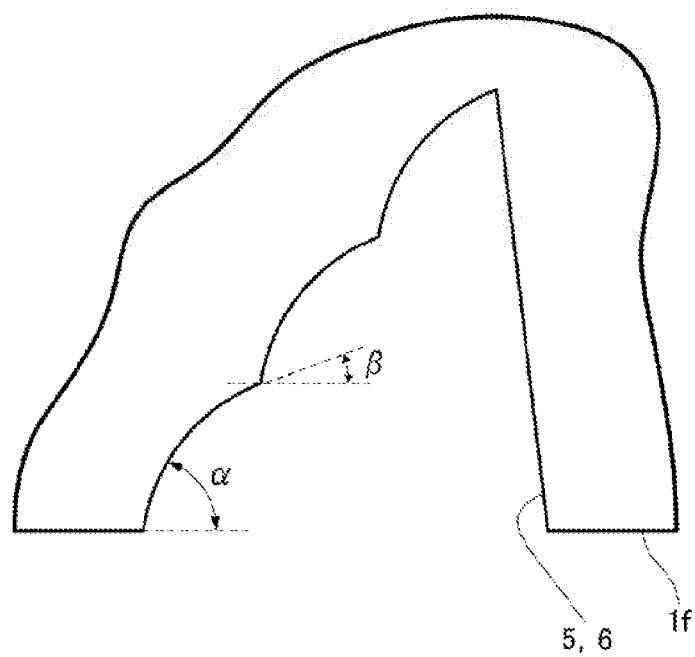
FIG. 18 is an enlarged cross-sectional view of the light guide plate showing another example of the fine shape in the multicolor display device according to the embodiment.

FIG. 16 to FIG. 18 respectively show other specific examples of fine shapes 5 and 6 in the multicolor display device according to the present disclosure.

Figure 19:
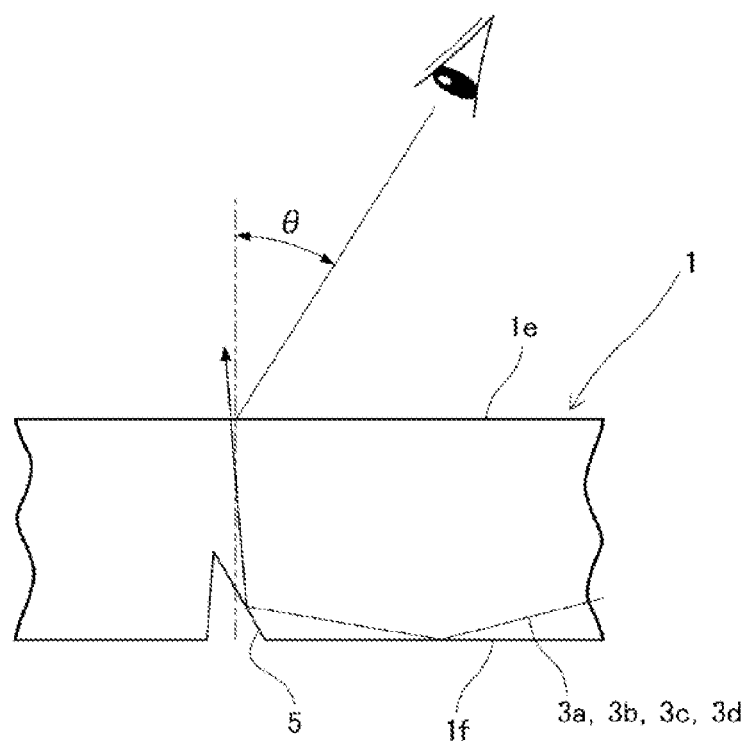
FIG. 19 is an enlarged cross-sectional view of the light guide plate for explaining viewing angle characteristics of Embodiments 1 to 4 of the present disclosure.
Figure 20:
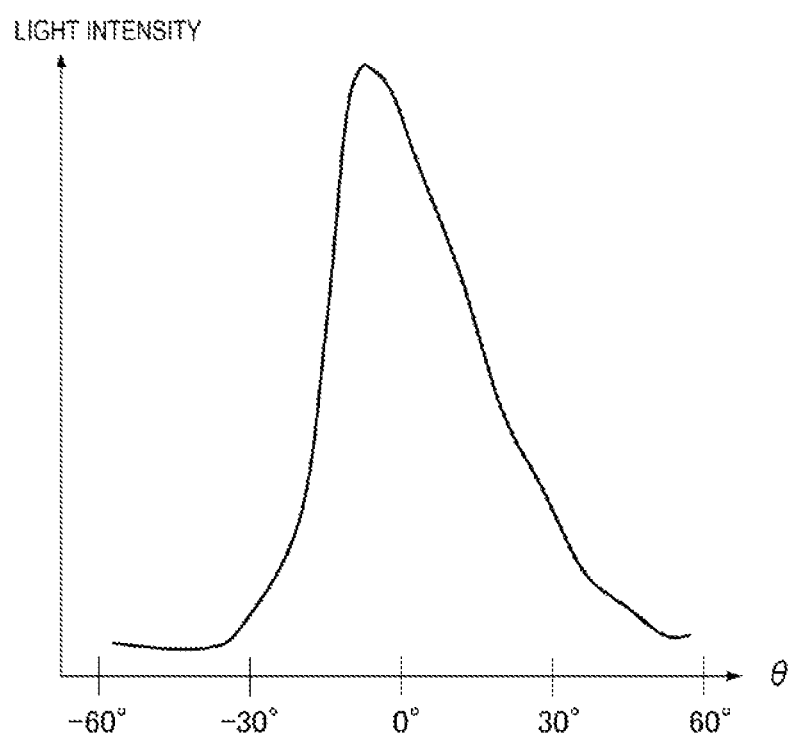
FIG. 20 is a graph showing viewing angle characteristics of the Embodiments 1 to 4 of the present disclosure.
Figure 21:
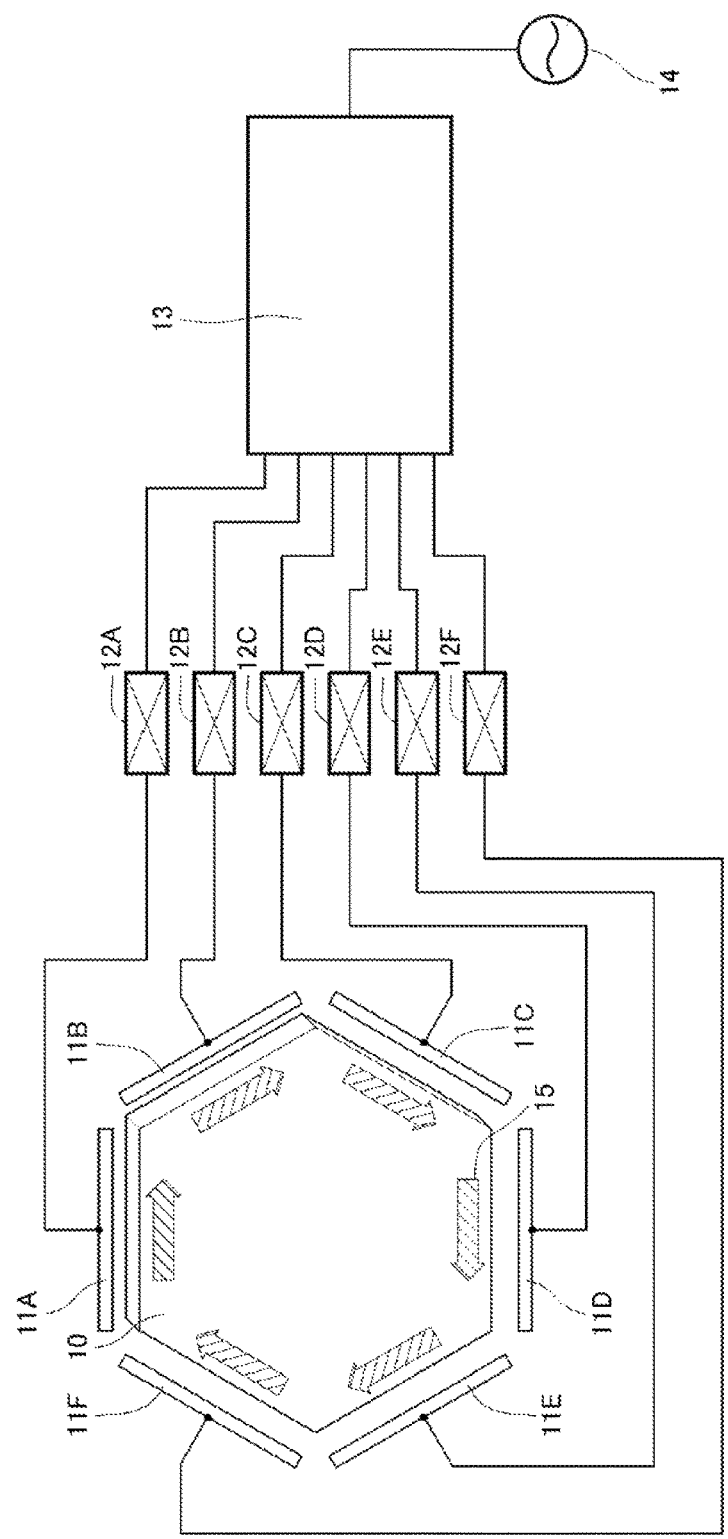
FIG. 21 is a configuration view of a multicolor display device described in Patent Document 1.

In the respective embodiments, cross-sectional shapes of the fine shapes 5 and 6 shown in FIG. 2 and FIG. 13 which are perpendicular to the light emitting surface 1e are the triangular shape and the trapezoidal shape. In these case, a viewing angle is narrow in viewing angle characteristics of an angle θ made by a direction of observation and a direction perpendicular to the rear wall surface 1f of the light emitting surface 1e as shown in FIG. 19. FIG. 20 is a graph showing light emitting characteristics by a reflection surface of the fine shape having an approximately triangular cross section. In FIG. 20, the horizontal axis indicates the angle made by a perpendicular line of the rear wall surface 1f, and 0 (zero) degrees indicates the front direction from the rear wall surface 1f. The vertical axis indicates the magnitude of light intensity. For example, the light intensity with a peak ratio of approximately 0.1 is obtained when observing from a direction of θ=30 degrees. This indicates that the light intensity is changed when the direction of observing the picture pattern is changed, which causes color unevenness as a whole.

In the embodiment, the light reflection surfaces of the fine shapes 5 and 6 are formed by a plural number of surfaces or curved surfaces as shown in FIG. 16 to FIG. 18.

In the example shown in FIG. 16, a cross section of the fine shapes 5 and 6 for reflecting light is formed by plural flat surfaces. The cross section of the fine shapes 5 and 6 is formed by flat surfaces with angles α, β, γ which are made with respect to the rear wall surface 1f. α=γ>β in this case.

In the example, shown in FIG. 17, a cross section of the fine shapes 5 and 6 for reflecting light is formed by a curved surface. The cross section of the fine shapes 5 and 6 is formed by the curved surface with, angles α to β which are made with respect to the rear wall surface 1f. α>β in which case.

In the example shown in FIG. 18, a cross section of the fine shapes for reflecting light is formed by plural curved surfaces. The cross section of the fine shapes 5 and 6 is formed by a group of curved surfaces including angles of α to β which are made with respect to the rear wall surface 1f. α>β in which case.

When the cross section of the fine shapes for reflecting light is formed by plural surfaces as shown in FIG. 16 to FIG. 18, incident light is reflected in various directions, therefore, angular spread in the light intensity can be widened. As a result, color unevenness caused when observing the picture pattern 4 from oblique directions can be suppressed to be small.

The multicolor display device according to the present disclosure can realize multicolor display, namely, color display with high color reproducibility which can be felt beautiful, therefore, the multicolor display device can be applied to display panels of various types of electric appliances, display panels of game machines, display panels of signage and so on.

What is claimed is:

1. A multicolor display device comprising:
    a light guide body on which a picture pattern is formed by an aggregation of fine shapes; and
    plural light sources for allowing lights to be incident into the light guide body,
    wherein the light guide body includes a light guide plate,
    wherein the lights incident on and introduced into the light guide body are reflected by the fine shapes and emitted from a light emitting surface of the light guide body to display the picture pattern, and
    the plural light sources include a plurality of first light sources emitting lights and a second light source emitting a light of white which is different from colors of the first light sources,
    wherein the plurality of first light sources include a red light source, a green light source, and a blue light source,
    wherein the light guide plate comprises a plurality of side surfaces including:
        a first side surface on which light from the red light source is incident;
        a second side surface on which light from the green light source is incident;
        a third side surface on which light form the blue light source is incident;
        a fourth side surface on which light from the second light source is incident;
        a light emitting surface from which light is emitted; and
        a rear wall surface facing the light emitting surface,
    wherein the aggregation of fine shapes is formed on the rear wall surface in accordance with the picture pattern,
    wherein each of the plurality of fine shapes includes a reflection surface,
    wherein the fine shapes reflect light from a particular direction toward the light emitting surface,
    wherein the reflection surfaces are arranged in a mixed state so that the reflection surfaces reflect green, blue, red and white lights,
    wherein respective colors of red, green, blue and white are allowed to be incident from respective edges of the side surfaces of the light guide plate corresponding to the reflection surfaces of the fine shapes,
    wherein respective gradations of red, green, and blue before conversion are respectively represented by Ir, Ig and Ib, and a gradation of white is represented by Iw,
    wherein a smallest gradation value in Ir, Ig and Ib is represented by Imin,
    wherein the gradation of white Iw=Imin,
    wherein the graduation of red is set to Ir−Iw,
    wherein the graduation of green is set to Ig−Iw,
    wherein the graduation of blue is set to Ib−Iw, and
    wherein the gradation value is controlled by a height "h" of the fine shapes or a pitch "p" of the fine shapes.

2. The multicolor display device according to claim 1, wherein a cross sectional shape of the fine shapes of the aggregation which is perpendicular to the light emitting surface of the light guide body is an approximately triangular shape or a trapezoidal shape.

3. The multicolor display device according to claim 1, wherein the light guide body includes
    a light guide plate body on which the picture pattern is formed and
    a light introducing path one end of which is connected to a side surface of the light guide plate body and the other side of which is extended to a back surface side of the light guide plate body through a curved surface portion.

4. The multicolor display device according to claim 1, wherein the reflection surface of the fine shape of the aggregation is formed by plural flat surfaces.

5. The multicolor display device according to claim 1, wherein the reflection surface of the fine shape of the aggregation is formed by a single curved surface.

6. The multicolor display device according to claim 1, wherein the reflection surface of the fine shape of the aggregation is formed by plural curved surfaces.

* * * * *